United States Patent
Ikegami (10) Patent No.: US 6,609,606 B2
(45) Date of Patent: Aug. 26, 2003

(54) APPARATUS AND METHOD FOR TEMPORARILY RETAINING ARTICLES MIDWAY A TRANSPORT SYSTEM

(75) Inventor: Iwao Ikegami, Shizuoka-ken (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/281,114

(22) Filed: Oct. 28, 2002

(65) Prior Publication Data

US 2003/0051975 A1 Mar. 20, 2003

Related U.S. Application Data (63) Continuation of application No. 10/067,861, filed on Feb. 8, 2002, now abandoned, which is a continuation of application No. 09/874,244, filed on Jun. 6, 2001, now abandoned, which is a continuation of application No. 08/950,749, filed on Oct. 15, 1997, now abandoned, which is a continuation of application No. 08/703,931, filed on Aug. 28, 1996, now abandoned, which is a continuation of application No. 08/525,243, filed on Sep. 8, 1995, now abandoned, which is a continuation of application No. 08/365,162, filed on Dec. 28, 1994, now abandoned, which is a continuation of application No. 08/161,802, filed on Dec. 6, 1993, now abandoned.

(30) Foreign Application Priority Data

Dec. 10, 1992 (JP) .............................. 4-352668

(51) Int. Cl.[7] ................................................ B65G 1/00
(52) U.S. Cl. .................................................. 198/347.3
(58) Field of Search ........................... 198/347.1, 347.2, 198/347.3, 435

(56) References Cited

U.S. PATENT DOCUMENTS

| | | | |
|---|---|---|---|
| 4,220,236 A | | 9/1980 | Blidung et al. |
| 4,396,338 A | | 8/1983 | Applegate et al. |
| 4,429,779 A | * | 2/1984 | Hinchcliffe .............. 198/347.3 |
| 4,499,987 A | | 2/1985 | Long |
| 4,609,091 A | | 9/1986 | Dorner |
| 4,964,498 A | | 10/1990 | Klingl |
| 5,009,303 A | | 4/1991 | Lutzke |
| 5,092,452 A | | 3/1992 | Nakayama |
| 5,176,242 A | | 1/1993 | Wegscheider |
| 5,253,743 A | | 10/1993 | Hass et al. |

FOREIGN PATENT DOCUMENTS

| | | |
|---|---|---|
| JP | 2-89719 | 3/1990 |
| JP | 2-225210 | 9/1990 |
| JP | 2-132008 | 11/1990 |
| RU | 1207905 | 1/1986 |

* cited by examiner

*Primary Examiner*—Joseph E. Valenza
(74) *Attorney, Agent, or Firm*—Oliff & Berridge, PLC (57) ABSTRACT

An article retention apparatus includes a roller conveyor unit with a plurality of rollers arranged in a horizontal plane and a plurality of ladder-shaped rack units on which articles rest. The roller conveyor unit and rack units are configured such that the rack units may be moved above and below the plane of the conveyor unit rollers without interference between the conveyor unit rollers and the rack units. By lifting the rack units one by one from below the roller plane to emerge above the roller plane, the article is transferred from the roller conveyor unit to the rack unit. The articles are taken aside of a transport system and temporarily retained by the apparatus. A belt conveyor unit can be used instead of the roller conveyor unit.

5 Claims, 12 Drawing Sheets

APPARATUS AND METHOD FOR TEMPORARILY RETAINING ARTICLES MIDWAY A TRANSPORT SYSTEM

This application is a continuation of Ser. 10/067,861 filed Jul. 8, 2002, now abandoned which is a continuation of Ser. No. 09/874,244 filed Jun. 6, 2001, now abandoned which is a continuation of Ser. No. 08/950,749 filed Oct. 10, 1997, now abandoned

BACKGROUND OF THE INVENTION

1. Field of the Invention

This invention relates to a transport system for feeding articles from station to station in a continuous manufacturing line and warehouse. More particularly, it relates to an apparatus and method for temporarily retaining articles midway the transport system.

2. Prior Art

A continuous manufacturing system includes a transport line in the form of a roller conveyor for feeding stock items or intermediate articles from station to station for processing and finally feeding finished articles to a packaging station or a shipping outlet. Midway the transport line, there sometimes arises a need to temporarily retain the stock items, intermediate articles or finished articles for a relatively short time. For example, in a process for manufacturing edible items including bread, cakes, noodles, and paste items, stock powder and suitable agents are mixed. It is often desired to retain such a mixture for some time at room temperature for aging for allowing the material to gain some drape, texture or body. When the material is heated as by baking, it is also desired to allow the material to cool down at room temperature. In such a situation, if one attempts to perform aging or cooling while the articles are being fed along the transport line, the line must be extremely extended. If the articles are removed off the line for aging or cooling purpose, then the process becomes discontinuous, resulting in less efficient operation. It is, therefore, desirable to temporarily retain the articles midway the transport line for aging or cooling. In another situation where there is a difference in processing speed between upstream and downstream stations, it is also desirable to temporarily retain articles midway the transport line between these stations. In a still further situation where articles are continuously fed along a transport line from within a warehouse to a shipping exit, if shipping is intermittent, it is desirable to temporarily retain articles midway the transport line.

Exemplary apparatus for temporarily retaining and storing articles midway a transport line are disclosed in Japanese Patent Application Kokai No. 225210/1990 and Japanese Utility Model Application Kokai No. 132008/1990 as comprising two multi-stage racks arranged in a transport line in a conveyance direction whereby articles being conveyed are sequentially loaded in the multi-stage racks and fed back to the transport line.

These apparatus have a satisfactory function of temporarily retaining and storing articles midway the transport line, but require a relatively complex and expensive mechanism for loading articles in the multi-stage racks. Because of the complex mechanism, maintenance is rather difficult.

SUMMARY OF THE INVENTION

Therefore, an object of the present invention is to provide an apparatus of simple, inexpensive construction for temporarily retaining articles midway a transport line and a retaining method using the apparatus.

An article retention apparatus for use in a transport system according to the present invention includes a conveyor unit having a conveying surface for supporting and conveying an article horizontally. A plurality of rack units each have support means on which an article rests horizontally. Suspension means is provided for suspending the plurality of rack units in a vertically spaced apart relationship while keeping the rack units horizontal. Drive means is provided for moving up and down the suspension means. The conveyor unit and the plurality of rack units are configured such that the rack units may be moved above and below the conveying surface of the conveyor unit without interference between the conveying surface of the conveyor unit and the support means of the rack units.

Preferably the suspension means includes generally flexible strips or chains and the plurality of rack units are attached to the strips or chains at predetermined intervals.

In one preferred embodiment, the conveyor unit comprises a roller conveyor unit having a plurality of rollers arranged in a horizontal plane. The rollers at their top define the conveying surface. More preferably, each rack unit is a ladder-shaped rack and the conveyor unit has a plurality of spaced apart rollers, the crosspieces of the ladder-shaped rack and the rollers are alternately arranged in a non-contact interdigitating relationship.

In another preferred embodiment, the conveyor unit comprises at least one belt conveyor unit having an endless belt. The belt presents a horizontal upper surface defining the conveying surface.

Using the article retention apparatus, articles are retained midway a transport system by placing the plurality of rack units on standby in a stack at a position below the conveying surface of the conveyor unit. An article is fed from the transport system to the conveyor unit so that the article rests on the conveying surface. The suspension means is lifted upward for moving upward the rack unit of the uppermost stage to emerge above the conveying surface, thereby transferring the article from the conveying surface to the support means of the rack unit. The suspension means is lifted in increment each time when a new article is fed and rested on the conveying surface, for moving upward the rack unit of the next lower stage to emerge above the conveying surface, thereby transferring the article from the conveying surface to the support means of the rack unit. The respective rack units retain the articles at spaced apart positions above the conveying surface for a desired time. Thereafter, the suspension means is moved downward in increment until each of the rack units is moved below the conveying surface of the conveyor unit, thereby transferring the article from the support means of the rack unit to the conveying surface. The articles are then discharged from the conveyor unit to the transport system.

In the article retaining apparatus of the invention, a plurality of rack units each having support means on which an article rests horizontally can be suspended by suspension members in a vertically spaced apart relationship while the rack units remain horizontal. The conveyor unit and the plurality of rack units are configured such that the rack units may be moved to positions above and below the conveying surface of the conveyor unit (which is the roller plane in the case of a roller conveyor and the belt surface in the case of a belt conveyor) without interference between the conveying surface of the conveyor unit and the support means of the rack units. Therefore, in retaining an article which has been fed to the conveying surface of the conveyor unit from the transport system, the rack unit of the uppermost stage among a plurality of rack units which have been placed on standby at a position below the conveying surface is lifted upward by the suspension members to emerge above the conveying surface whereby the article on the conveying surface is transferred to the support means of the rack unit. That is, the article rests on the rack unit independent of the conveyor unit. Rack units of subsequent lower stages are then sequentially lifted from the standby position to emerge above the conveying surface to thereby sequentially transfer the articles from the conveying surface to the support means of the rack units. The articles are stored on the respective rack units which are lifted above the conveyor unit.

Transport of the articles which have been stored as mentioned above is restarted by moving down the suspension members to cause the rack units to descend from above to below the conveying surface of the roller conveyor unit. On passage of each rack unit across the conveying surface, the article on the rack unit is left on the conveying surface and then horizontally fed by the conveyor unit along its the conveying surface. By sequentially moving the rack units below the conveying surface, the articles are fed from the rack units back to the conveying surface of the conveyor unit and then horizontally fed until they are fed back to the transport system.

In the preferred embodiment wherein the suspension members are chains or strips which are flexible as a whole, the chains can flex between the rack units, which allows the rack units, when they are on standby below the conveying surface, to be closely stacked on a stationary surface below the conveying surface.

DESCRIPTION OF THE PREFERRED EMBODIMENT

Figure 1:
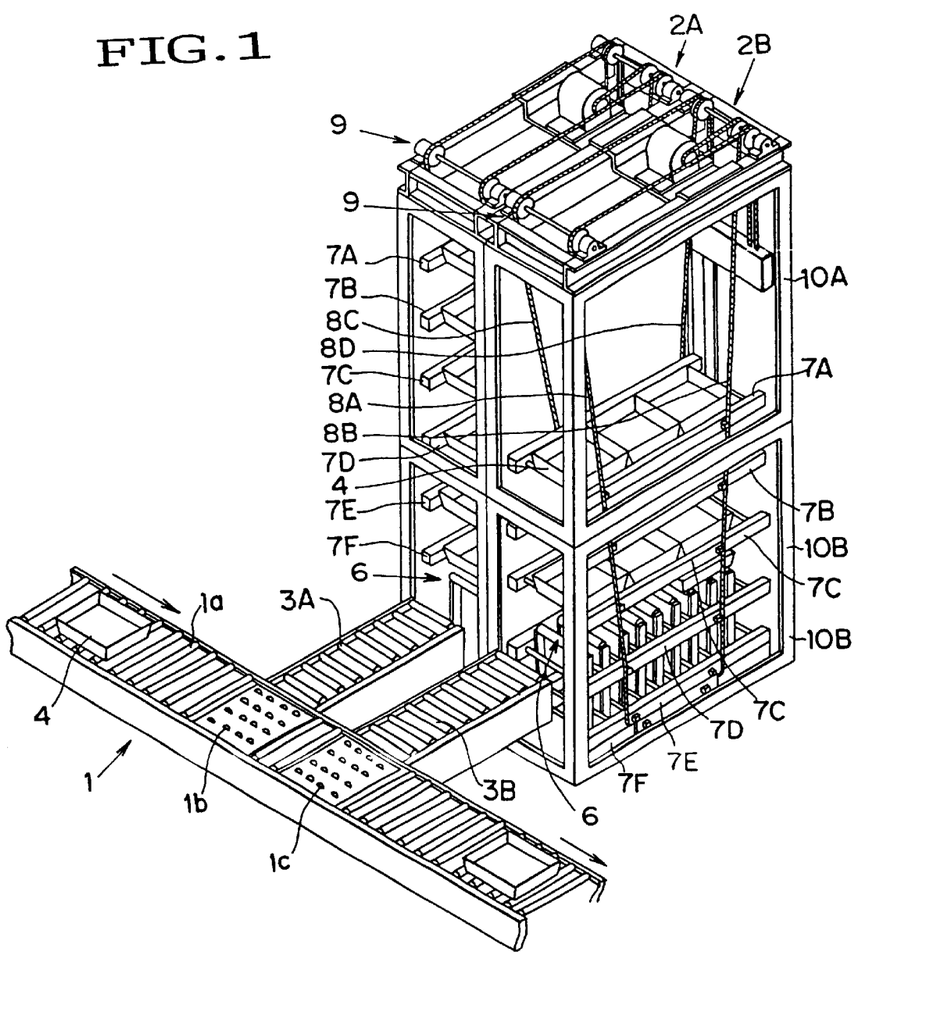
FIG. 1 is a perspective view showing an overall transport system having incorporated therein a temporary retention apparatus according to one embodiment of the present invention.
Figure 2:
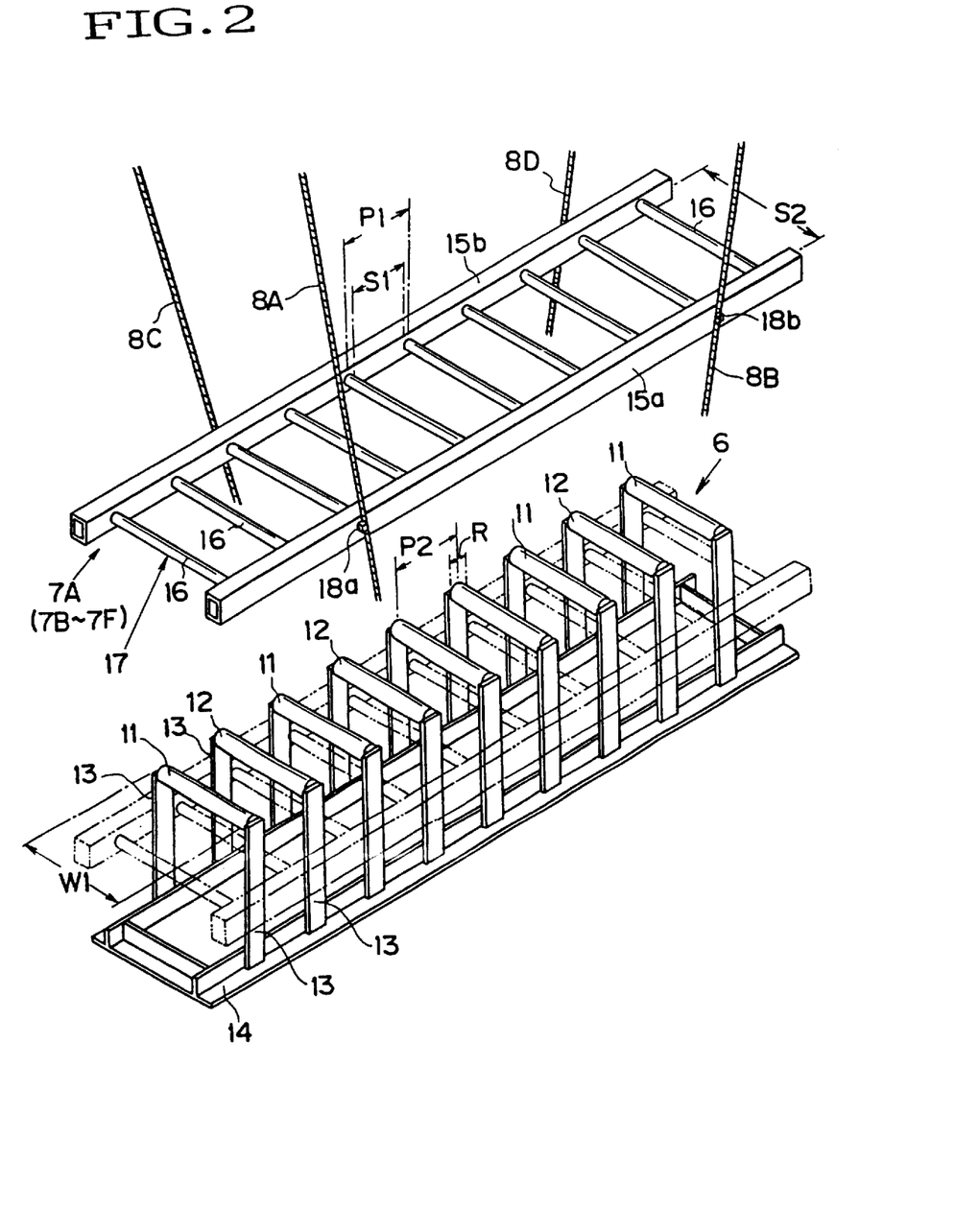
FIG. 2 is a perspective view showing a roller conveyor unit and rack units included in the exemplary retention tower shown in FIG. 1.
Figure 3:
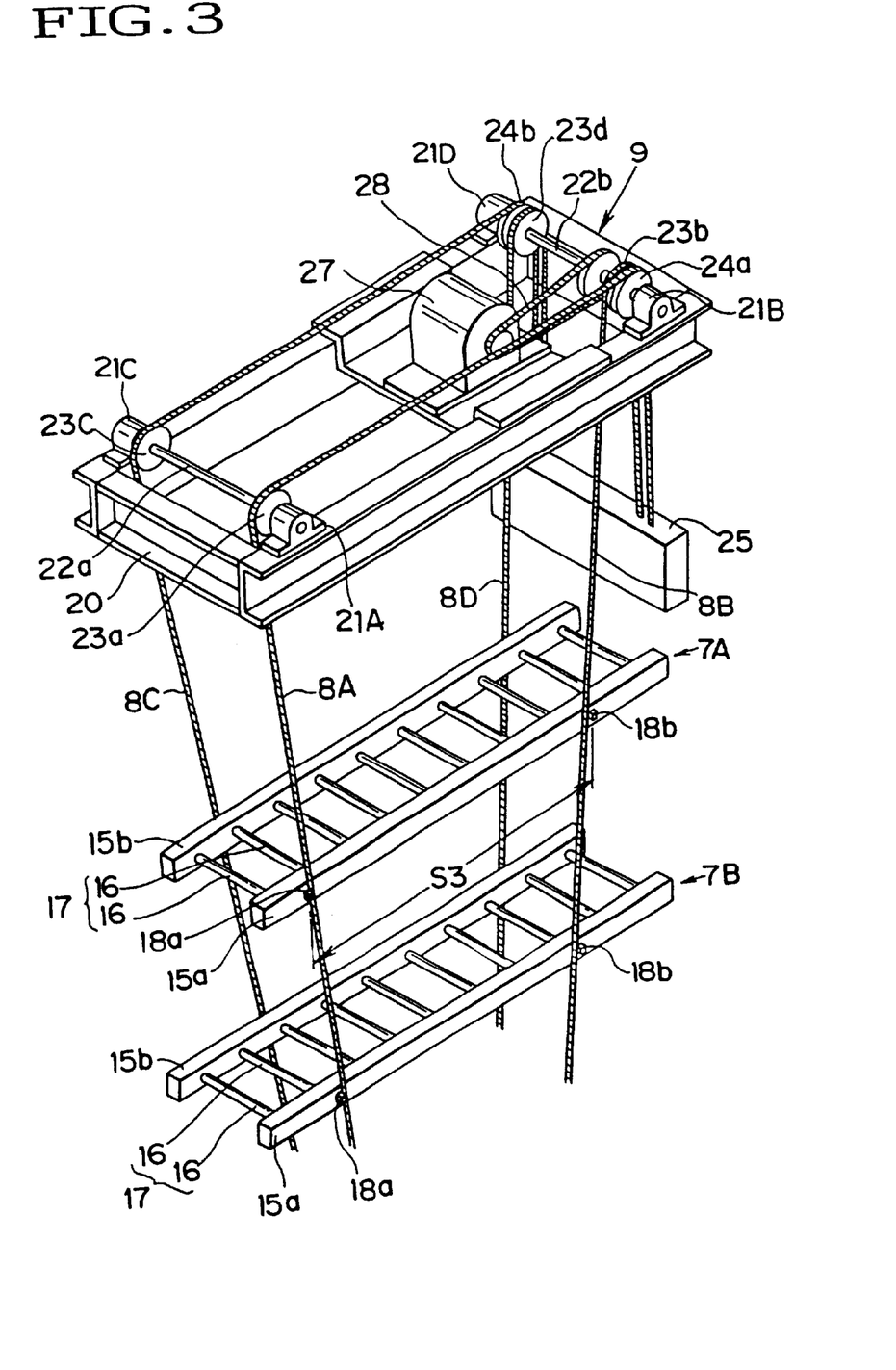
FIG. 3 is a perspective view showing a drive unit, suspension chains and rack units included in the exemplary retention tower shown in FIG. 1.

FIG. 1 illustrates an overall transport system having incorporated therein a temporary retention apparatus according to one embodiment of the present invention. FIGS. 2 and 3 illustrate major components of the retention apparatus. In this embodiment, a roller conveyor is used as a conveyor unit of the retention apparatus.

In FIG. 1, the transport system includes a main transport line 1 in the form of a conventional roller conveyor 1a for feeding articles 4 in an arrow direction. Disposed perpendicular to the main transport line 1 at a suitable position are a pair of parallel arranged temporary retention towers 2A and 2B. A pair of junction conveyors 3A and 3B each in the form of a conventional roller conveyor are disposed between the main transport line 1 and the retention towers 2A and 2B. A pair of ball conveyors 1b and 1c are disposed in the sections of the main transport line 1 connected to the junction conveyors 3A and 3B for permitting the article 4 on the main transport line 1 to be fed in both a main feed direction along the main transport line 1 and a transverse direction toward the retention towers 2A and 2B.

The retention towers 2A and 2B are described in detail. Since these two retention towers 2A and 2B are identical, only one of them is described. Each of retention towers 2A and 2B includes a roller conveyor unit 6, a plurality of (six in the illustrated embodiment) rack units 7A to 7F, four suspension members 8A to 8D, a drive unit 8, and a pair of upper and lower stage frame units 10A and 10B for supporting these components.

Each of the frame units 10A and 10B is constructed from channel bars into a generally rectangular shape. The upper frame unit 10A is stacked on the lower frame unit 10B, and they are removably joined by means of bolts (not shown) into an assembly. Although a two stage stack is illustrated herein, a vertical stack of more than two stages is also possible as will be described later and, of course, a single stage frame unit is acceptable.

Figure 4:
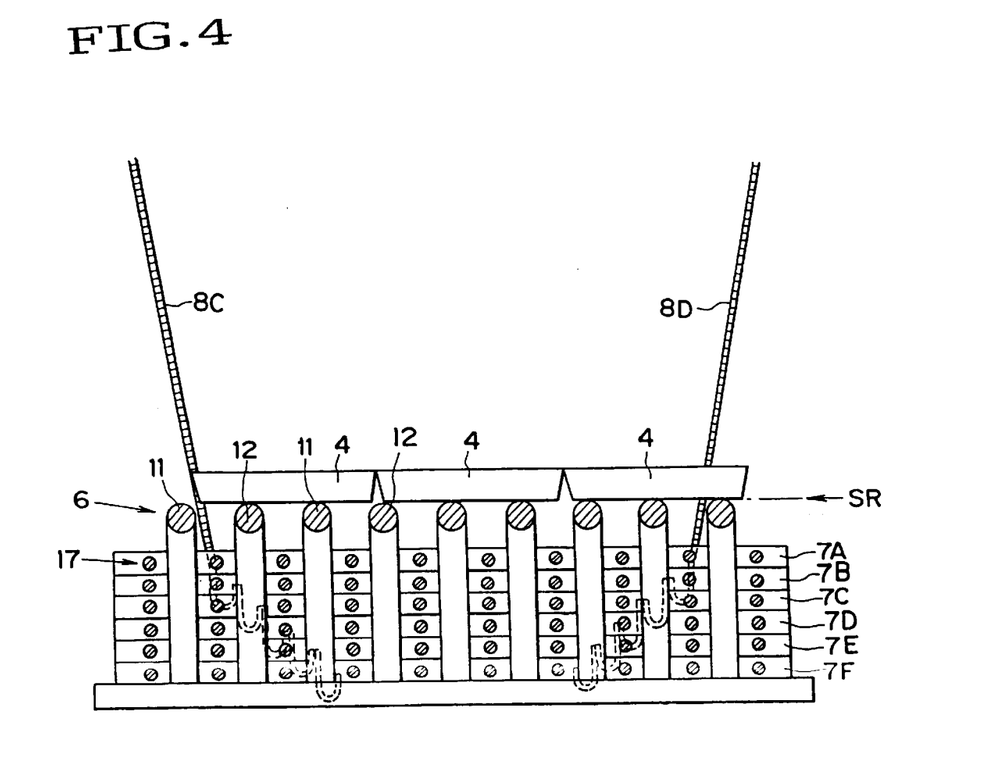
FIG. 4 is a side elevation of rack units in a standby state for illustrating the operation of the retention tower of FIG. 1.

Referring to FIG. 2, the roller conveyor unit 6 includes a plurality of drive rollers 11 adapted to be driven in both forward and backward directions, a plurality of free rollers 12 adapted to freely rotate, the drive and free rollers 11 and 12 being alternately arranged at predetermined intervals in a parallel array, and plural pairs of vertical stands 13 anchored to a rectangular base 14. Each of the drive and free rollers 11 and 12 at its ends is mounted between a pair of stands 13 for rotation. The rollers including drive and free rollers are arranged at a pitch $P_2$ and has an outer diameter R. The rollers are parallel arranged in a horizontal plane which is referred to as a roller plane, hereinafter (exactly speaking, the roller plane is defined as a plane SR passing the top of the respective rollers as shown in FIG. 4). The roller conveyor unit 6 is accommodated within the lower stage frame unit 10B of the frame unit assembly, with the base 14 being removably secured to the bottom of the frame unit 10B by means of bolts (not shown). The drive rollers 11 each have a drive motor built therein in the illustrated embodiment although an external drive motor may be coupled to the drive rollers 11 through a suitable transmission mechanism.

Each of the rack units 7A to 7F is of a generally ladder shape including a pair of parallel long side bars 15a, 15b and a plurality of spaced apart short crosspieces 16 spanning between the bars 15a, 15b as shown in FIGS. 2 and 3. The plurality of crosspieces 16 cooperatively form a comb-shaped support means or surface 17 on which an article rests. The plurality of crosspieces 16 are arranged at a pitch $P_1$ which is equal to the pitch $P_2$ between the conveyor rollers 11, 12. The spacing $S_1$ between the adjacent crosspieces 16 is greater than the outer diameter R of the conveyor rollers 11, 12. The spacing $S_2$ between the side bars 15a and 15b is greater than the width $W_1$ of the roller conveyor unit 6 (more exactly, the distance between the outer ends of the stands 13 supporting the rollers). When the rack units 7A to 7F are vertically moved above and below the roller plane (a plane passing the top of the respective rollers, also referred to as a conveying surface) with their attitude kept horizontal, the crosspieces 16 of the rack units 7A to 7F (defining the support means 17) pass between the rollers 11, 12 of the roller conveyor unit 6 and the side bars 15a, 15b of the rack units 7A to 7F move outside the stands 13 of the roller conveyor unit 6 so that no interference occurs between the rack unit crosspieces 16 and the conveyor rollers 11, 12 and between the rack unit side bars 15a, 15b and the conveyor stands 13.

The plurality of rack units 7a to 7F are suspended by a drive unit 9 through suspension means including four flexible chains 8A to 8D as shown in FIG. 3. More particularly, the rack unit side bars 15a, 15b at the outside are provided with fixtures 18a, 18b in the form of claws or pins at a longitudinally equidistance from the center of each side bar. The spacing $S_3$ between the fixtures 18a and 18b is reduced from the upper stage to the lower stage rack unit. The chains 8A to 8D are suspended from the four corners of the drive unit 9 so that they may be moved up and down. The chains 8A to 8D are removably engaged to the fixtures 18a, 18b of the rack units 7A to 7F. The positions of engagement of the fixtures 18a, 18b of the rack units 7A to 7F with the chains 8A to 8D are at a predetermined spacing along the length of each chain 8A to 8D. The spacing $S_3$ between the left and right fixtures 18a and 18b of the rack units 7A to 7D is reduced as one goes to the lower stage rack unit so that when all the rack units 7A to 7f are suspended, the chains 8A to 8D are obliquely extended. It is seen from FIG. 1 that a pair of chains 8A and 8B define a frusto-triangle shape.

The drive unit 9 is removably secured to the top of the upper frame unit 10A of the frame unit assembly by means of bolts (not shown). As shown in FIG. 3, the drive unit 9 includes a rectangular base frame 20, pillow blocks 21A to 21D disposed near the four corners of the frame 20, rotating shafts 22a and 22b extending between the pillow blocks 21A and 21C and 21B and 21D, respectively, and rotatably supported thereby, and sprockets 23a to 23d mounted on the shafts 22a and 22b and adapted to be in meshing engagement with the chains 8A to 8D for suspending the chains 8A to 8D from the drive unit 9. Relay sprockets 24a, 24b are mounted on the shaft 22b and adapted to be in meshing engagement with the chains 8A, 8C. The distal ends of the chains 8A to 8D are extended from the sprockets 24a, 23b, 24b, 23d and secured to a weight 25. The shaft 22b is adapted to be driven for rotation by a rotational drive source 27 capable of forward and backward rotation in the form of a geared motor fixedly secured to the base frame 20, via a rotation transmission mechanism 28 such as a belt.

Referring to FIGS. 1 and 4 to 7, the operation of the temporary retention towers 2A, 2B shown in FIGS. 1 to 3 is described.

The article 4 to be fed and retained is horizontally fed by the main transport line 1 consisting mainly of the roller conveyor 1a from the left upper position toward the right lower position in FIG. 1. The article 4 is a generally rectangular container or pallet in the illustrated embodiment and actually, stock items, intermediate products or final products are placed in the container, but are omitted for the sake of convenience in the figures. Depending on their shape, the stock items or products can be directly placed on the roller conveyor without using the container.

When each article 4 is fed to the ball conveyor 1b by the main transport line 1, a pusher (not shown) pushes the article 4 to turn its feed direction at a right angle. The articles 4 are then fed to the retention tower 2A through the junction conveyor 3A and placed on the rollers 11, 12 of the roller conveyor unit 6, that is, on the roller plane SR. The articles 4 resting on the roller plane (or conveying surface) SR are shown in FIG. 4. The initial state shown in FIG. 4 is a standby state wherein the chains 8A to 8D are extended to the maximum length and the rack units 7A to 7F are vertically closely overlaid in a stack below the conveyor rollers 11, 12. The respective slack sections of the chains 8A to 8D each between two adjacent ones of the rack units 7A to 7F sag under gravity in a J bent shape.

Figure 5:
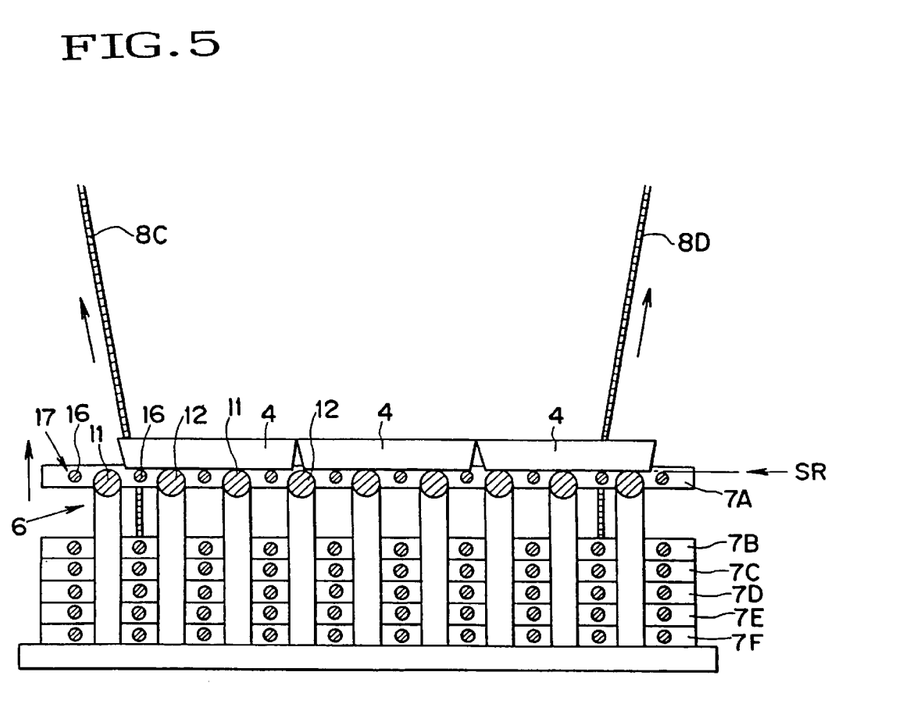
FIG. 5 is a side elevation similar to FIG. 4, showing the state that articles are being transferred from the roller conveyor to the rack unit of the uppermost stage.
Figure 6:
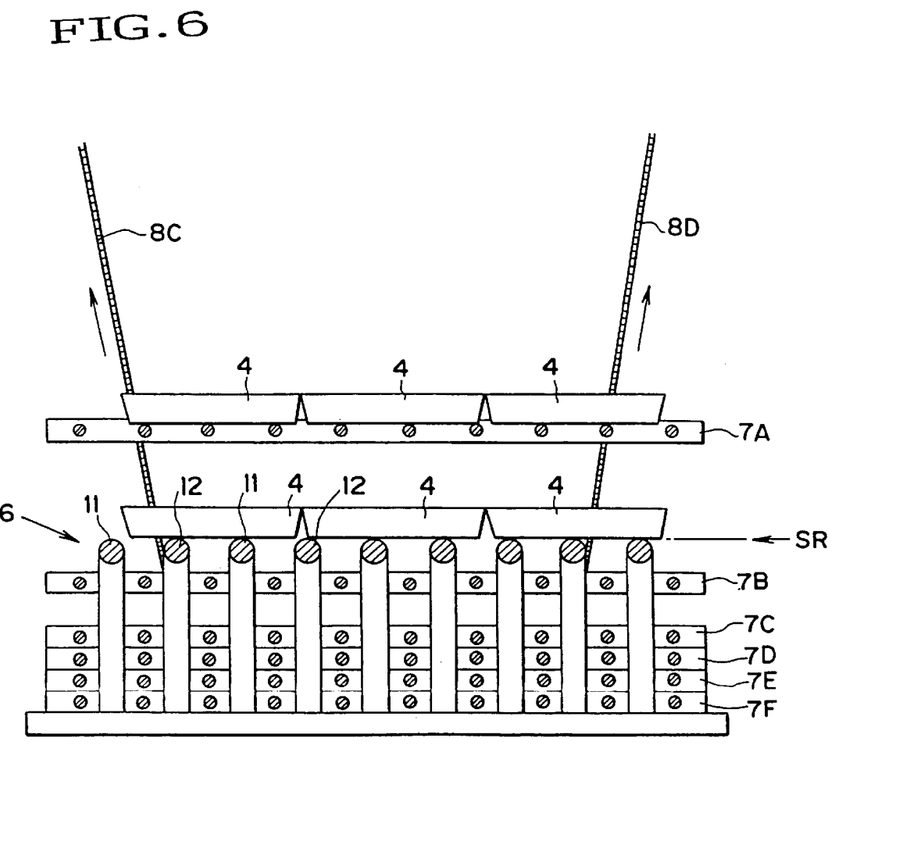
FIG. 6 is a side elevation similar to FIG. 4, showing the state immediately after the articles have been transferred from the roller conveyor to the rack unit of the uppermost stage.

Once the articles 4 rest on the roller plane SR, the rotational drive source 27 such as a geared motor of the drive unit 9 is actuated. The rotational drive force is transmitted to the shaft 22b through the transmission mechanism 28 whereby the sprockets 24a, 24b, 23a to 23d are rotated to pull up the chains 8A to 8D. The rack unit 7A of the uppermost stage is then lifted upward with its attitude kept horizontal as shown in FIG. 5. When the rack unit 7A moves upward past the roller plane SR, the articles 4 resting on the roller plane SR are picked up by the plurality of crosspieces 16 of the rack unit 7A serving as the support means 17. That is, the articles 4 are transferred from the rollers 11, 12 of the roller conveyor unit 6 to the rack unit 7A. This state is shown in FIG. 6.

Then the lifting of the chains 8A to 8D or the drive source 27 is interrupted. During this quiescent period, a next set of articles 4 are fed from the main transport line 1 to the roller conveyor unit 6 in the same manner as described above. Once the articles 4 have rested on the roller plane SR, the rotational drive source 27 of the drive unit 9 is actuated again to pull up the chains 8A to 8D whereby the rack unit 7B of the second upper stage is lifted from below to above the roller plane SR. Then the articles 4 on the roller plane SR are transferred to the rack unit 7B.

Figure 7:
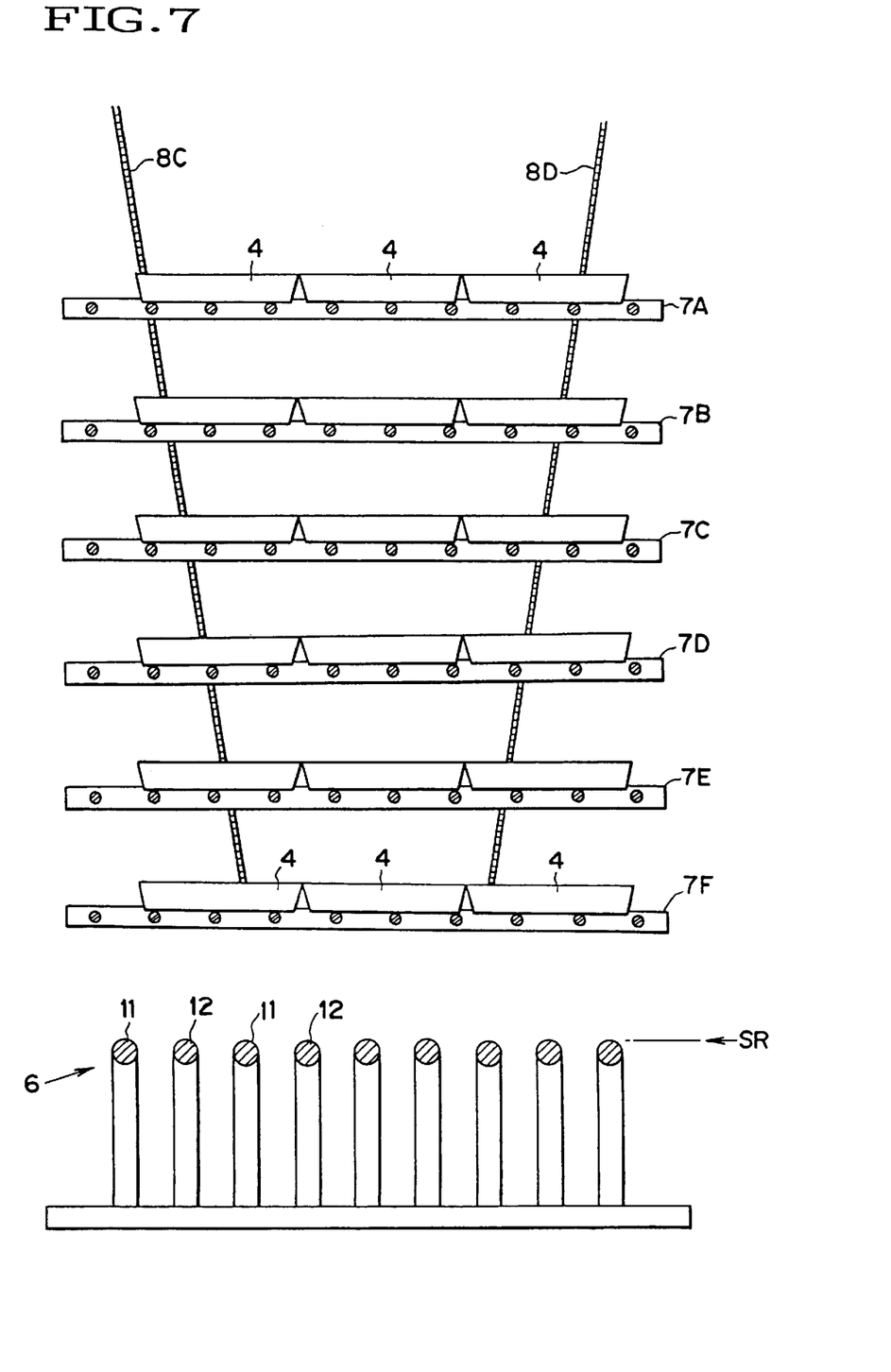
FIG. 7 is a side elevation similar to FIG. 4, showing the state that all the rack units of one retention tower are loaded with articles.

Thereafter, the rack units 7C to 7F of subsequent stages are sequentially lifted in the same manner as described above whereby the articles 4 are transferred to the rack units 7C to 7F. When the articles 4 have been transferred to the rack unit 7F of the lowermost stage, all the rack units 7A to 7F are above the roller plane SR as shown in FIG. 7. Although lifting of the rack units 7A to 7F by the chains 8A to 8D is intermittent in this embodiment, the rack units 7A to 7F can be continuously lifted if the roller conveyor unit 6 can be loaded with a set of articles 4 in appropriate timing or in a synchronous manner.

When one retention tower 2A is fully loaded with articles in this way, subsequent articles 4 are fed from the main transport line 1 to the other retention tower 2B via ball conveyor 1c and junction conveyor 3B whereupon the rack units 7A to 7F of the other retention tower 2B are sequentially loaded with articles in the same manner as described above.

After the articles are retained and stored for a predetermined time, the articles are fed back to the main transport line from the retention towers 2A and 2B by repeating the above-mentioned operation in a reverse manner. More particularly, the rotational drive source 27 of one retention tower 2A is actuated in the reverse direction to extend downward the chains 8A to 8D a predetermined distance. The rack unit 7F of the lowermost stage is moved from above to below the roller plane SR of the roller conveyor unit 6 whereby the articles 4 on the support means 17 (crosspieces 16) of the rack unit 7F are left on the roller plane SR. Then the drive rollers 11 of the roller conveyor unit 6 are driven in the reverse direction to feed the articles 4 toward the junction conveyor 3A along the roller plane SR. The articles 4 are discharged from the retention tower 2A to the junction conveyor 3A by which they are fed to the ball conveyor 1b in the main transport line 1. A pusher (not shown) pushes each of the articles to turn its feed direction from the ball conveyor 1b toward the main transport line 1. The articles are fed forward by the roller conveyor 1a along the main transport line 1. Next, the rack unit 7E of the second lower stage is moved from above to below the conveyor roller plane SR whereby the articles 4 are transferred from the rack unit 7E to the roller plane SR and thereafter fed back to the main transport line 1 in the same manner as described above. Thereafter, the articles 4 on the rack units 7D to 7A are sequentially fed back to the main transport line 1 in a similar manner.

Since the spacing $S_3$ between the fixtures 18a and 18b in the rack units 7A to 7F is reduced from the upper stage to the lower stage rack unit, the chains 8A to 8D are obliquely extended when the rack units 7A to 7F are lifted as shown in FIGS. 1 and 7. As compared with parallel or vertical extension, the oblique extension of chains 8A to 8D is effective for restraining the rack units 7A to 7F from swing motion in a longitudinal direction (parallel to the loading and unloading direction of the articles 4 to and from the retention towers 2A, 2B), thus holding the rack units relatively stable. When the rack units 7A to 7F are stacked below the roller plane SR, the fixtures 18a, 18b are horizontally offset between the vertically adjacent ones of the rack units 7A to 7F, permitting the slack chain sections between the adjacent ones of the fixtures 18a (or 18b) to sag in J shape. This is effective for preventing the slack chain sections between the vertically adjacent ones of the rack units 7A to 7F from tangling with the fixtures 18a, 18b or other parts or with each other. Then on lifting, the rack units 7a to 7F can be moved up smoothly without any twining of the chains 8A to 8D with the fixtures 18a, 18b and any mutual entangling of the chains 8A to 8D.

If it is desired to increase the capacity of each retention towers 2A, 2B to accommodate articles in the illustrated embodiment, the number of rack units 7A to 7F suspended from the chains 8A to 8D is increased and the number of the vertically stacked frame units 10A, 10B is optionally increased. Since the chains 8A to 8D are removably engaged with the fixtures 18a, 18b and the upper and lower frame units 10A and 10B are removably connected, it is quite easy to install an additional rack unit or units and an additional frame unit. The entire tower is an assembly of unit structures in the illustrated embodiment. This is advantageous when the entire tower is to be installed in a containment with a narrow inlet because the respective units can be carried into the containment and assembled at an installation site therein.

Figure 8:
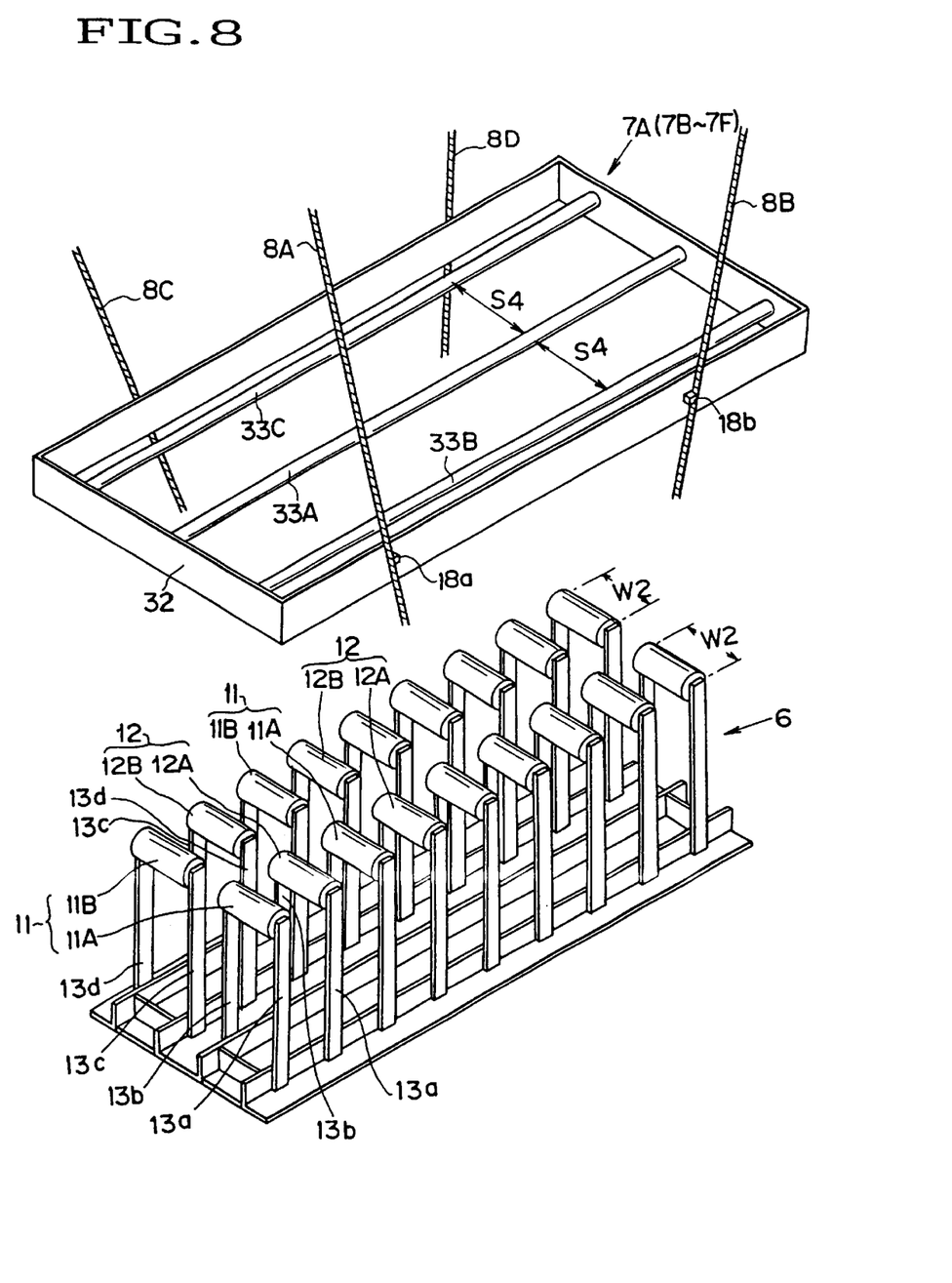
FIG. 8 is a perspective view showing a roller conveyor unit and rack units according to another embodiment.

FIG. 8 illustrates another example of the roller conveyor unit 6 and rack units 7A to 7F of the retention tower according to the present invention.

In FIG. 8, each of the drive and free rollers 11 and 12 of the roller conveyor unit 6 consists of two or more roller segments. The roller conveyor unit 6 of FIG. 8 includes two rows of drive and free roller segments. One row is a series of drive roller segments 11A and free roller segments 12A alternately arranged parallel at a predetermined spacing and the other row is a series of drive roller segments 11B and free roller segments 12B alternately arranged parallel at a predetermined spacing. The roller segments 11A, 12A of one row are supported for rotation by stands 13a, 13b and the roller segments 11B, 12B of the other row are supported for rotation by stands 13c, 13d. The one row is laterally spaced from the other row, that is, a spacing is left between the stands 13b and 13c.

Each of the rack units 7A to 7F includes a rectangular frame 32 having longitudinal and transverse sides. A center support rod 33A longitudinally straddles between the transverse sides at the center. Side support rods 33B, 33C longitudinally extend between the transverse sides at a distance $S_4$ from the center. The spacing $S_4$ between the center support rod 33A and side support rods 33B, 33C of each rack unit 7A to 7F is greater than the width $W_2$ of each roller conveyor unit row (more exactly, the distance between the outer ends of the stands 13c, 13d supporting the roller segments). The longitudinal sides of the rack unit frame at the outside are provided with fixtures 18a, 18b at a longitudinally equidistance from the center of each side for removable engagement with the chains 8A to 8D.

Also in the example shown in FIG. 8, the rack units 7A to 7F can be moved up and down by the chains 8A to 8D. The rack units 7A to 7F can be moved below and above the roller plane of the roller conveyor unit 6 without any interference therebetween, that is, without any interference between the support rods 33A to 33C of the rack units 7A to 7F and the roller segments 11A, 11B, 12A, 12B and stands 13a to 13d of the roller conveyor unit 6. Then articles can be transferred between the roller plane of the roller conveyor unit 6 and the rack units 7A to 7F.

Figure 9:
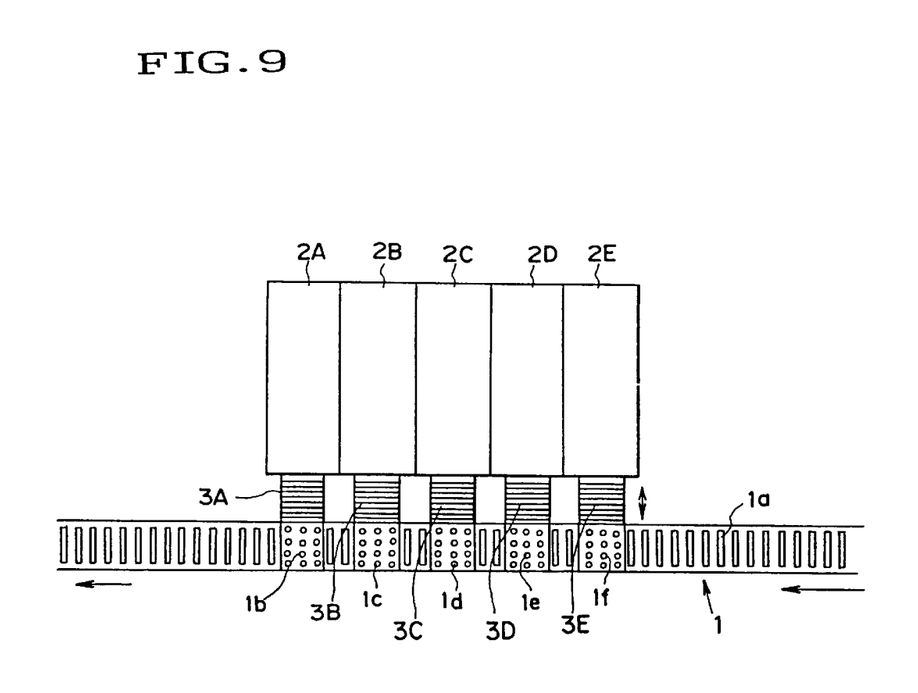
FIG. 9 is a plan view of another arrangement of retention towers relative to the main transport line, which is adapted for a first come, first go system.

FIG. 9 shows in plan view another arrangement including a multiplicity of retention towers, for example, five retention towers 2A to 2E. Each of the retention towers 2A to 2E is of the same structure as the previously mentioned retention tower 2A of FIG. 1.

In FIG. 9, the main transport line 1 consists mainly of a roller conveyor 1a and includes ball conveyors 1b to 1f at positions corresponding to the retention towers 2A to 2E. Each of the ball conveyors 1b to 1f is of the same construction as that in the FIG. 1 embodiment capable of turning the feed direction of an article at right angles. Junction conveyors 3A to 3E are disposed between the ball conveyors 1b to 1f and the retention towers 2A to 2E, respectively.

The arrangement shown in FIG. 9 permits for a first come-first go system. After temporary retention of the articles in the retention towers 2A to 2E, those articles which are earlier loaded in the retention towers 2A to 2E can be unloaded earlier than the later loaded ones. Exemplary operation is described at several stages shown in FIGS. 10 to 13.

Figure 10:
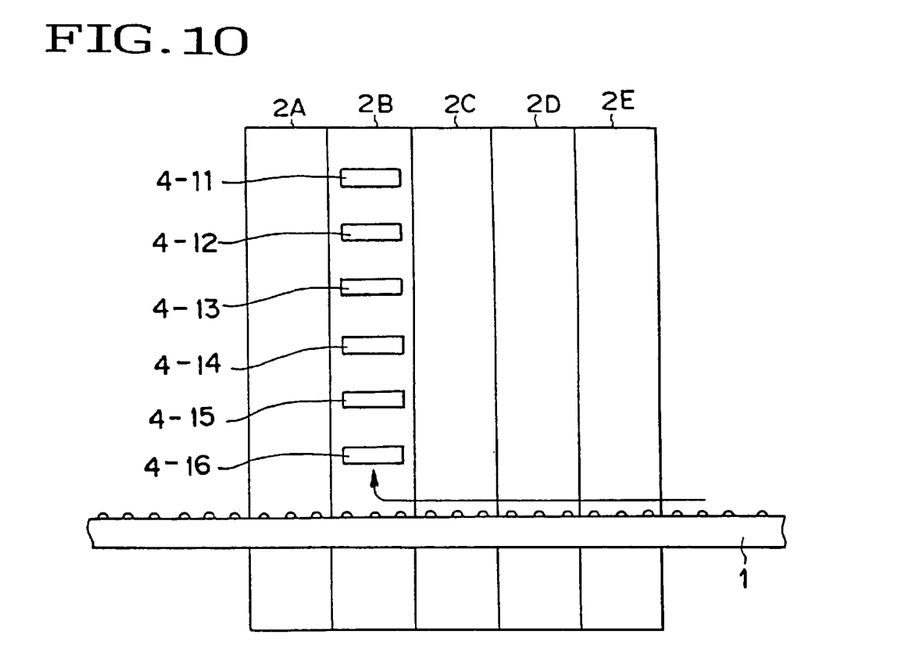
FIG. 10 is a schematic elevation of the arrangement of FIG. 9 showing the initial stage at the start of loading articles.

First referring to FIG. 10, the first retention tower 2A at the farthest side in the feed direction of the main transport line 1 is left empty. The second retention tower 2B is sequentially loaded with articles 4-11 to 4-16 coming from the main transport line 1. The first come article 4-11 is placed on the uppermost stage rack unit and subsequent articles 4-12 to 4-16 are placed on the lower stage rack units in accordance with their order of arrival.

Figure 11:
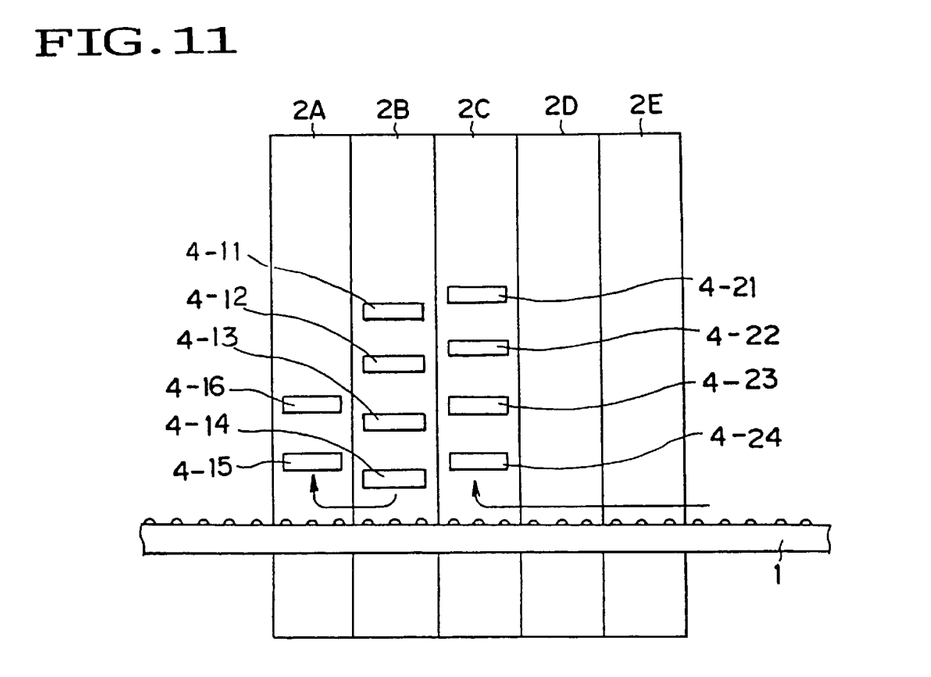
FIG. 11 is a schematic elevation similar to FIG. 10, showing an intermediate stage.

When the second retention tower 2B is fully loaded, the third retention tower 2C is sequentially loaded with articles 4-21 to 4-24 as shown in FIG. 11. Thereafter, the fourth and fifth retention towers 2D and 2E are sequentially loaded with articles in a similar manner. On the other hand, after the second retention tower 2B has been fully loaded, as also shown in FIG. 11, the articles 4-11 to 4-16 in the second retention tower 2B are once discharged to the main transport line 1 and fed back along a U-shaped route via a part of the main transport line 1, but to the first retention tower 2A, which are loaded with the articles 4-11 to 4-16. At this point, the order of stacking the articles in the first retention tower 2A is reverse to the order of stacking of the articles 4-11 to 4-16 in the second retention tower 2B. That is, the articles are loaded in the first retention tower 2A in the order of from 4-16 (top) to 4-11 (bottom). Differently stated, the article 4-11 which was first loaded in the second retention tower 2B is located at the lowermost stage in the first retention tower 2A and the articles which were later loaded in the second retention tower 2B are located at higher stages in the first retention tower 2A.

Figure 12:
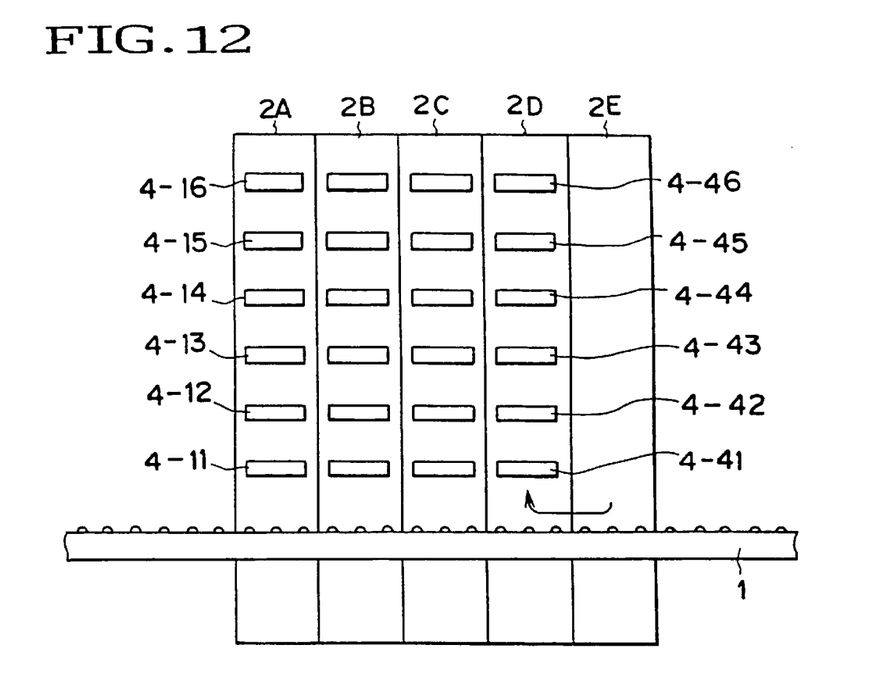
FIG. 12 is a schematic elevation similar to FIG. 10, showing an final stage when the retention towers are fully loaded with articles.

After all the articles 4-11 to 4-16 are relocated from the second retention tower 2B to the first retention tower 2A in this way, the articles in the third retention tower 2C are once discharged and relocated to the second retention tower 2B in a similar manner. Thereafter the same procedure is repeated. FIG. 12 shows the final state when the articles 4-41 to 4-46 have been relocated from the fifth retention tower 2E to the fourth retention tower 2D. It will be understood that in each of the retention towers 2A to 2D, articles of earlier arrival are located at lower stages. At this point, the fifth retention tower 2E is empty.

Figure 13:
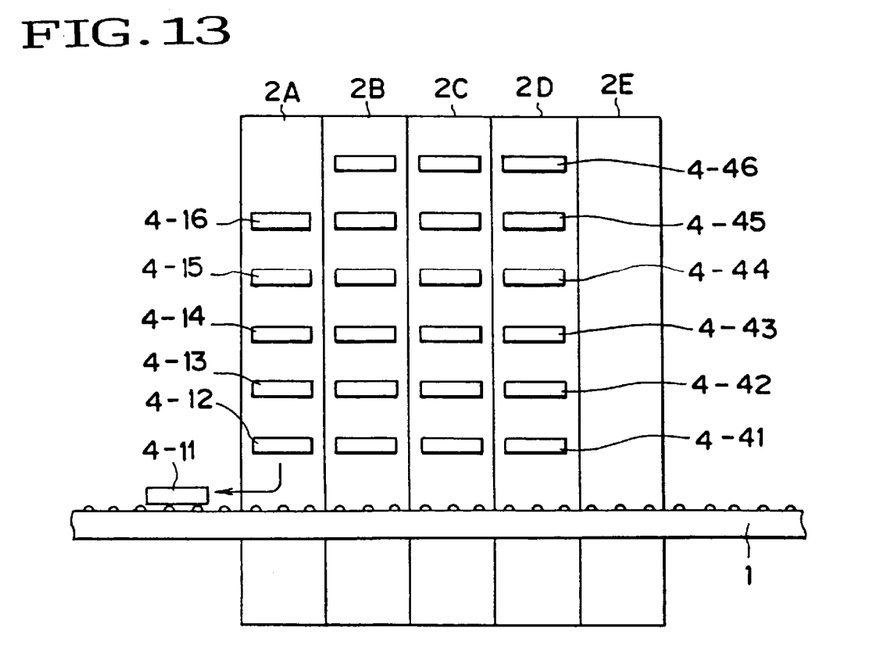
FIG. 13 is a schematic elevation similar to FIG. 10, showing a next stage at the start of unloading articles.

At the point of time when a predetermined time has passed since the start of loading of articles, that is, when at least the first come article has finished aging or heat release, the articles 4-11 to 4-16 are unloaded from the first retention tower 2A to the main transport line 1 as shown in FIG. 13. At this point, the article 4-11 at the lowermost stage of the first retention tower 2A is first unloaded and thereafter articles 4-12 to 4-16 are sequentially unloaded in the order of from lower to upper stages. This means that from the retention tower 2A, the first come article is first discharged and the second and later come articles are discharged in the order of their arrival. Thereafter, the articles are similarly discharged sequentially from each of the second to fourth retention towers 2B to 2E to the main transport line 1.

In this way, articles are sequentially discharged from the retention towers 2A to 2E to the main transport line 1 in the order of their arrival or loading. That is, the first come article goes out first. Then all the articles reside in the tower for an equal duration. This arrangement is best suited where an exact residence time is strictly required.

It will be understood that even when a plurality of articles rest on each of rack units 7A to 7F (see FIG. 1) within each of the retention towers 2A to 2E, the configuration of FIGS. 10 to 13 permits the first come, first go system to be also applied to the plurality of articles in the single rack unit.

Figure 14:
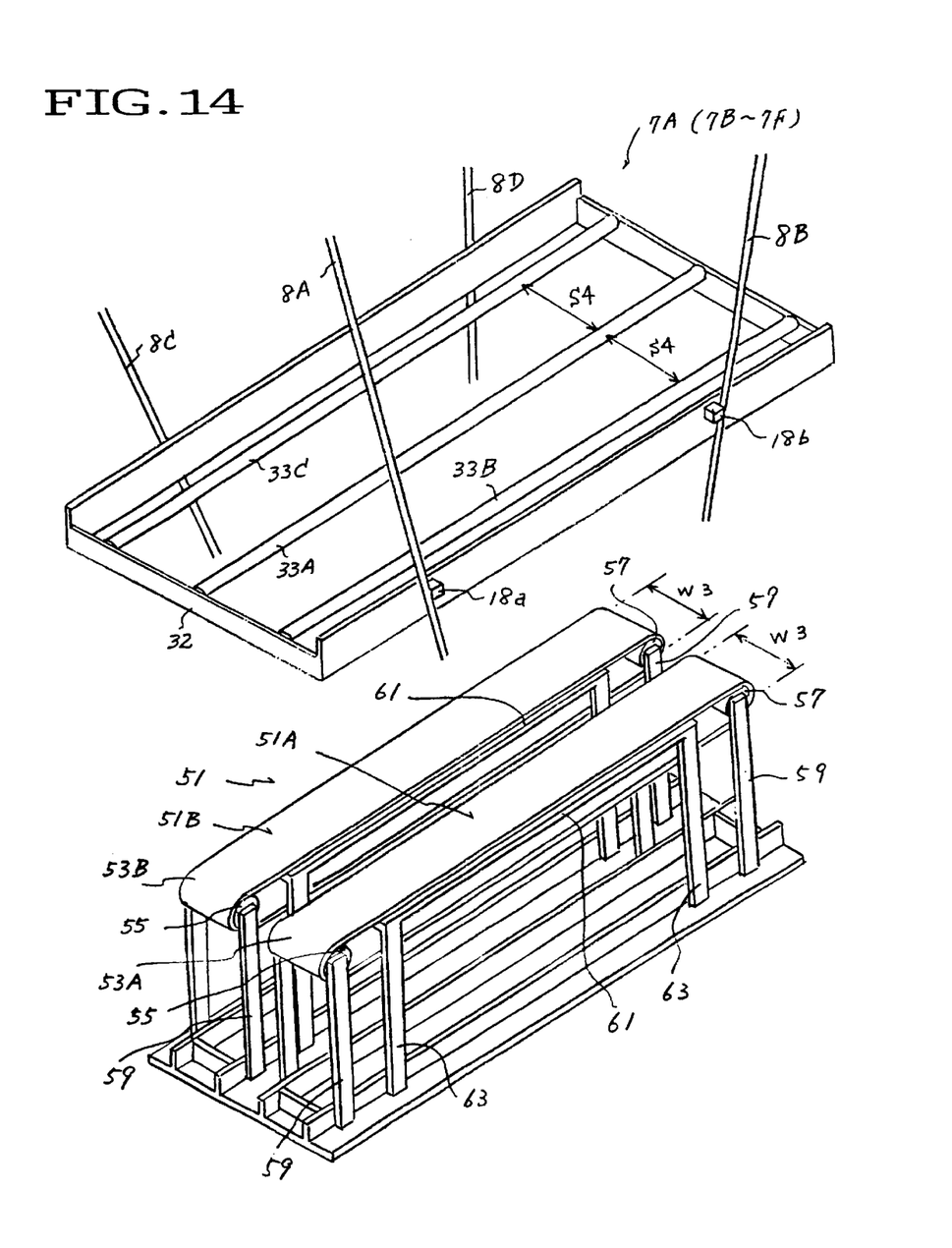
FIG. 14 is a perspective view showing a belt conveyor unit and rack units according to a further embodiment of the present invention.

Referring to FIG. 14, there is illustrated a further embodiment of the retention apparatus according to the present invention in which a belt conveyor unit 51 is used as the conveyor unit in combination with rack units 7A to 7F. The belt conveyor unit 51 includes a pair of belt conveyors 51A and 51B arranged parallel such that their upper surfaces are horizontal. The upper belt surfaces cooperatively define a conveying surface. Each of the belt conveyors 51A and 51B includes an endless belt 53A, 53B extended between a drive roller 55 and a drive roller 57. The rollers 55 and 57 are supported by upright support arms 59. The drive roller 55 is coupled to rotational drive means (not shown). Disposed between the rollers 55 and 57 and immediately below the upper section of the belt 53A, 53B is a bed 61 for supporting the belt upper section horizontally between the rollers 55 and 57 while the belt travels. The bed 61 is supported by upright support arms 63.

Since the rack units 7A to 7F are of the same construction as shown in FIG. 8, they need not be described in detail. The spacing $S_4$ between the center support rod 33A and side support rods 33B, 33C of each rack unit 7A to 7F is greater than the width $W_3$ of each belt conveyor 51A or 51B.

Also in the embodiment shown in FIG. 14, the rack units 7A to 7F can be moved up and down by the chains 8A to 8D. The rack units 7A to 7F can be moved below and above the conveying surface (upper belt surface) of the belt conveyor unit 51 without any interference therebetween, that is, without any interference between the support rods 33A to 33C of the rack units 7A to 7F and the belts 53A and 53B and support arms 59, 63 of the belt conveyors 51A and 51B of the belt conveyor unit 51. Then articles can be transferred between the conveying surface of the belt conveyor unit 51 and the rack units 7A to 7F.

There has been described an article retention apparatus combined with a transport system according to the present invention. By lifting the rack units from below to above the conveying surface (roller plane or belt surface) of the roller or belt conveyor unit, articles are transferred from the conveying surface to the rack units. Simply by holding the rack units suspended above the conveying surface, the articles are retained and stored in the retention apparatus. By lowering the rack units from above to below the conveying surface of the conveyor unit, articles are transferred from the rack units to the conveyor unit and fed back to the main transport line. The apparatus has many benefits including simple construction, low cost, a smaller number of drives, and ease of maintenance.

The preferred embodiment wherein the suspension means are comprised of flexible strips or chains is advantageous in that when a plurality of rack units are in a standby position below the conveying surface of the conveyor unit, the rack units can be closely stacked with the suspension chains made loose. When it is desired to use a larger number of rack units in order to increase the accommodation capacity, it is unnecessary to substantially elevate the conveying surface. This allows not only the overall apparatus to be compact, but also the height of the conveying surface to match with the height of the existing roller or belt conveyor line. Then the retention apparatus can be easily applied to the existing conveyor line.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An article retention apparatus for use in a transport system, comprising a conveyor unit including a conveying surface for supporting and conveying an article horizontally, said conveying surface defining a conveying plane, a plurality of rack units each having support means on which the article rests horizontally, said plurality of rack units being located in stacked relation to each other underneath the conveying surface in a standby position, suspension means for suspending the plurality of rack units in a vertically spaced apart relationship while keeping the rack units horizontal above the conveying surface in a retention position, and drive means for driving the suspension means to vertically move the plurality of rack units between the standby position and the retention position, wherein the suspension means moves each of said rack units from the standby position through said conveying plane to the retention position without interference between the conveying surface of said conveyor unit and the support means of said rack units.

2. The article retention apparatus of claim 1 wherein said suspension means includes generally flexible strips and said plurality of rack units are attached to the strips at predetermined intervals.

3. The article retention apparatus of claim 1 wherein said conveyor unit comprises a roller conveyor unit having a plurality of rollers arranged in a horizontal plane, the rollers at their top defining the conveying surface.

4. The article retention apparatus of claim 1 wherein said conveyor unit comprises at least one belt conveyor unit having an endless belt, the belt presenting a horizontal upper surface defining the conveying surface.

5. A method for retaining articles midway a transport system using the article retention apparatus of claim 1, placing said plurality of rack units in the standby position underneath the conveying surface of the conveyor unit, feeding an article from the transport system to the conveyor unit so that the article rests on the conveying surface, driving the suspension means to move the uppermost rack unit of said plurality of rack units so that said uppermost rack unit emerges above the conveying surface through said conveying plane, thereby transferring the article from the conveying surface to the support means of the rack unit, sequentially driving the suspension means each time when a new article is fed and rested on the conveying surface, to move the next rack unit of the plurality of rack units so that said next rack unit emerges above the conveying surface through said conveying plane, thereby transferring the article from the conveying surface of the conveyor unit to the support means of said next rack unit, suspending the respective rack units in the retention position to retain the articles at spaced apart positions above the conveying surface, thereafter, sequentially driving the suspension means until each of the rack units moves below the conveying surface of the conveyor unit through said conveying plane, thereby transferring the article from the support means of the rack unit back to the conveying surface, and discharging the article from the conveyor unit to the transport system.

* * * * *